(12) United States Patent
Choi et al.

(10) Patent No.: US 7,517,449 B2
(45) Date of Patent: Apr. 14, 2009

(54) WATER PURIFICATION FILTER EASILY REPLACED BY CONNECTOR AND WATER PURIFICATION SYSTEM USING THE SAME

(75) Inventors: Suk Rim Choi, Incheon-shi (KR); Seok Bong Bang, Incheon-shi (KR)

(73) Assignee: Picogram Co., Ltd., Bucheon-Shi (KR)

( * ) Notice: Subject to any disclaimer, the term of this patent is extended or adjusted under 35 U.S.C. 154(b) by 674 days.

(21) Appl. No.: 11/178,886

(22) Filed: Jul. 11, 2005

(65) Prior Publication Data

US 2006/0213821 A1      Sep. 28, 2006

(30) Foreign Application Priority Data

Mar. 24, 2005    (KR) ..................... 10-2005-0024622

(51) Int. Cl.
  *B01D 35/153*   (2006.01)
  *B01D 35/30*    (2006.01)
(52) U.S. Cl. .................... 210/136; 210/232; 210/321.6; 210/418; 210/443; 210/455
(58) Field of Classification Search .......... 210/109.117, 210/130, 132, 136, 137, 232, 234, 235, 321.6, 210/418, 420, 422, 423, 424, 429, 433.1, 210/323.1, 335, 340, 440, 443, 444, 321.87, 210/455, 456
See application file for complete search history.

(56) References Cited

U.S. PATENT DOCUMENTS 3,334,754 A * 8/1967 Kudlaty ..................... 210/444

| | | | | |
|---|---|---|---|---|
| 5,128,035 A | * | 7/1992 | Clack et al. .................. | 210/251 |
| 5,826,854 A | * | 10/1998 | Janvrin et al. ............. | 251/149.9 |
| 7,294,262 B2 | * | 11/2007 | Tadlock ....................... | 210/232 |
| 7,387,725 B2 | * | 6/2008 | Choi et al. ................... | 210/232 |
| 2002/0125183 A1 | * | 9/2002 | Chaney et al. .............. | 210/234 |
| 2005/0173317 A1 | * | 8/2005 | Schmitt ...................... | 210/109 |
| 2005/0173319 A1 | * | 8/2005 | Fritze et al. ................. | 210/137 |

* cited by examiner

*Primary Examiner*—Joseph W Drodge
(74) *Attorney, Agent, or Firm*—Ladas & Parry LLP

(57) ABSTRACT

The present invention discloses a water purification filter easily replaced by a connector which can simplify a connection structure of a water purification system by forming paths of feed water, purified water and concentrated water as one port, and which can be easily replaced after disconnection of a filter cartridge from the water purification system, and a water purification system using the same. The water purification filter easily replaced by the connector includes a connector having an inflow hole through which feed water flows in, a check valve body in which a check valve for opening/closing a feed water flowing path for guiding feed water to a filter side and a concentrated water discharge path are formed, an outflow hole for externally discharging purified water, and a concentrated water control hole for externally discharging concentrated water, a filter housing for opening the feed water flowing path by opening the check valve in connection with the connector, a locking means for detachably fixing the filter housing to the connector, and a passage switching guide having a first path for supplying feed water to a reverse osmosis membrane filter when the filter housing is connected to the connector, a second path for supplying water purified by the reverse osmosis membrane filter to the outflow hole, and a third path for supplying concentrated water to the concentrated water discharge path.

15 Claims, 20 Drawing Sheets

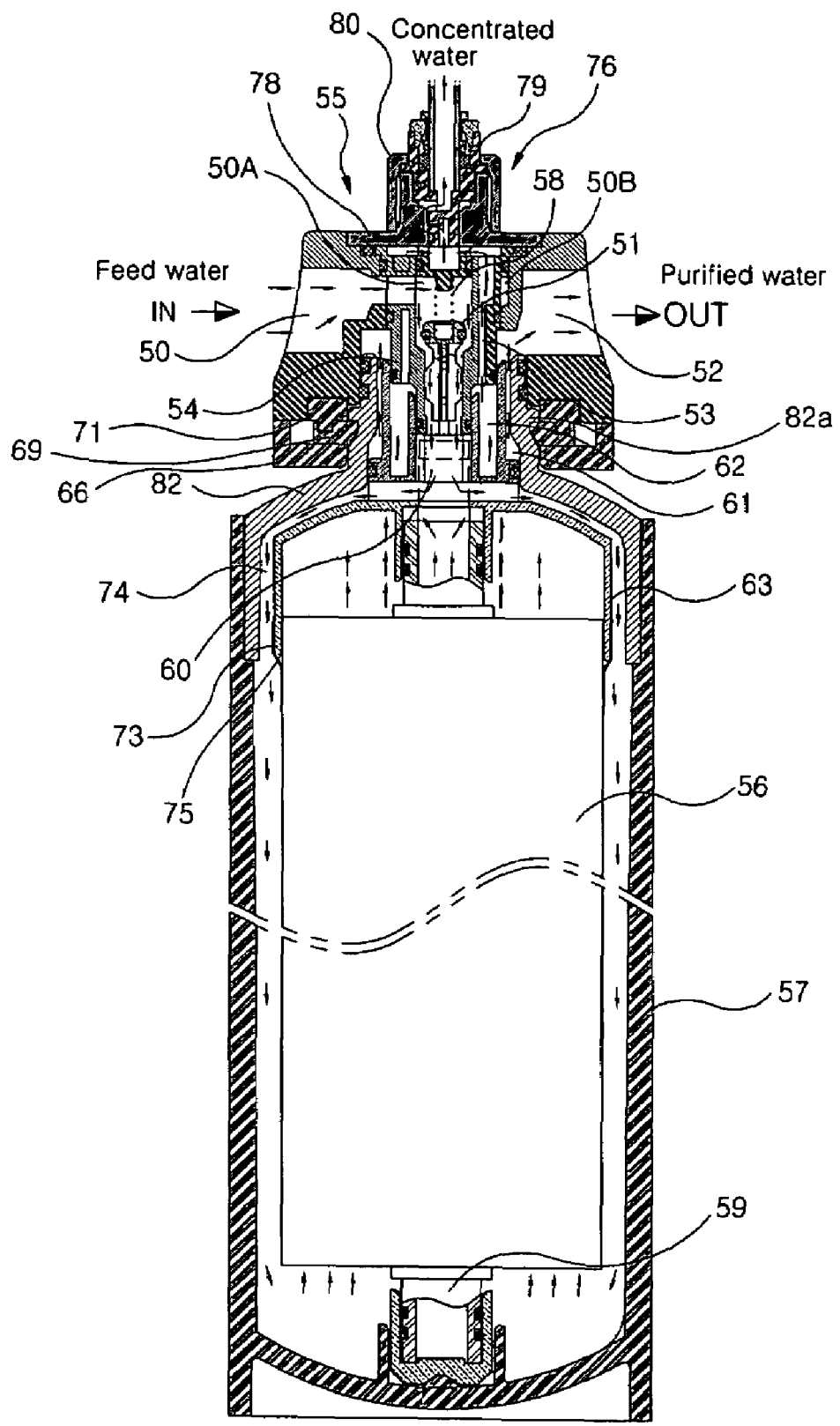

WATER PURIFICATION FILTER EASILY REPLACED BY CONNECTOR AND WATER PURIFICATION SYSTEM USING THE SAME

BACKGROUND OF THE INVENTION

1. Field of the Invention

The present invention relates to a water purification filter which can be easily replaced by a connector which does not require an operation of locking a feed water locking valve by automatically closing a passage by a check valve, when a filter cartridge of a water purification system using a reverse osmosis membrane filter is disconnected for replacement, and a water purification system using the same, and more particularly, to a water purification filter which can simplify a connection structure of a water purification system by forming paths of feed water, purified water(product water) and concentrated water as one port, and which can be easily replaced by a connector for disconnecting a filter cartridge from the water purification system and replacing an internal filter, and a water purification system using the same.

2. Description of the Related Art

FIG. 1 is a schematic structure diagram illustrating a conventional water purification system using a reverse osmosis membrane filter.

Referring to FIG. 1, the conventional water purification system includes a sediment filter 1 for removing, by a nonwoven fabric, macro-sized alien substances such as solid matters floating in rust, soil and sand from feed water (for example, underground water) flowing in through a hose connected to a tap (not shown), a precarbon filter 2 for removing chlorine elements and organic chemical substances remaining in water by an adsorption method of an activated charcoal made by burning mineral matters of coal or a palm tree at a high temperature, a reverse osmosis membrane filter 3 for removing various contaminants, germs, inorganic substances and heavy metal from water through 0.0001 microns of minute pores by a polyamide composite film, and a postcarbon filter 4 for improving water taste by removing smells and gas elements from water.

Here, the impurities (concentrated water) filtered by the reverse osmosis membrane filter 3 are externally discharged through a concentrated water control valve 5.

As shown in FIG. 2, the conventional reverse osmosis membrane filter includes a cap 7, an inflow hole 6 through which feed water flows in being protruded from one end of the cap 7, a filter housing 10 which the reverse osmosis membrane filter 3 for filtering various alien substances of feed water is installed in and which a purified water discharge hole 8 and a concentrated water discharge hole 9 are separately formed on, and a core-shaped tube 12 installed at the center of the reverse osmosis membrane filter 3 in the length direction, for collecting purified water filtered by the reverse osmosis membrane filter 3 through a through hole 11, and sending the collected water to the purified water discharge hole 8.

Reference numeral 13 denotes a sealing member for preventing feed water and concentrated water from being mixed by intercepting leakage of feed water from the reverse osmosis membrane filter 3 by taping.

As described above, since the purified water discharge hole 8 and the concentrated water discharge hole 9 are separately formed on the reverse osmosis membrane filter 3, the prime cost of production increases. In addition, special components such as a hose and a connection member are required to connect the filters of the water purification system. It is thus difficult to install and assemble the water purification system in a narrow space. General consumers who do not have knowledge or experience in filter replacement cannot easily replace the filters, and thus must stand the after/sale service expense.

Furthermore, when one filter cartridge is replaced in the water purification system having the plurality of filter cartridges, a passage is closed by switching a feed water locking device into a lock state, the filter cartridge is replaced, and the feed water locking device is switched into an unlock state. As a result, operational efficiency is reduced.

SUMMARY OF THE INVENTION

Accordingly, it is a primary object of the present invention to provide a water purification filter which can be easily replaced by a connector improving operational efficiency by omitting an operation of locking a feed water locking valve by intercepting leakage of feed water by switching a check valve into an initial lock state by a water pressure and a restoring force of an elastic member, when a filter cartridge of a water purification system is disconnected for replacement, and a water purification system using the same.

Another object of the present invention is to provide a water purification filter which can simplify a connection structure and an assembly process of a water purification system by a structure of a reverse osmosis membrane filter having paths of feed water, purified water and concentrated water as one port, and a water purification system using the same.

Still another object of the present invention is to provide a water purification filter which can be easily replaced by general consumers by easily disconnecting a filter cartridge from a water purification system, and a water purification system using the same.

In order to achieve the above-described objects of the present invention, there is provided a water purification filter easily replaced by a connector, including: a connector having an inflow hole through which external feed water flows in, a check valve body in which a check valve installed to open/close a feed water flowing path for guiding feed water from the inflow hole to a filter side is formed and a concentrated water discharge path is formed outside the check valve, an outflow hole for externally discharging water purified by a filter, and a concentrated water control hole for externally discharging concentrated water through a concentrated water discharge path, and controlling a discharge amount of concentrated water; a filter housing for housing a reverse osmosis membrane filter, and opening the feed water flowing path by opening the check valve in connection with the connector; a locking means installed in the connector, for detachably fixing the filter housing to the connector; and a passage switching guide being installed at the upper portion of the filter housing, and having a first path for supplying feed water to the reverse osmosis membrane filter from the feed water flowing path opened when the filter housing is connected to the connector, a second path for supplying water purified by the reverse osmosis membrane filter to the outflow hole, and a third path for supplying concentrated water from the reverse osmosis membrane filter to the concentrated water discharge path.

According to one aspect of the present invention, a water purification filter easily replaced by a connector includes: a connector having an inflow hole through which external feed water flows in, a check valve body in which a check valve installed to open/close a feed water flowing path for guiding feed water from the inflow hole to a filter side is formed and a concentrated water discharge path is formed outside the check valve, and an outflow hole for externally discharging water purified by a filter; a filter housing for housing a reverse osmosis membrane filter, and opening the feed water flowing path by opening the check valve in connection with the connector; a locking means installed in the connector, for detachably fixing the filter housing to the connector; a passage switching guide being installed at the upper portion of the filter housing, and having a first path for supplying feed water to the reverse osmosis membrane filter from the feed water flowing path opened when the filter housing is connected to the connector, a second path for supplying water purified by the reverse osmosis membrane filter to the outflow hole, and a third path for supplying concentrated water from the reverse osmosis membrane filter to a concentrated water discharge path; a double-tube type connection tube installed on the outflow hole, for externally discharging purified water passing through the second path through a purified water path formed at the center in the length direction, and externally discharging concentrated water passing through the third path and the concentrated water discharge path through a concentrated water path formed outside the purified water path; and a concentrated water discharge tube linked to the concentrated water path of the connection tube, and branch-connected to the rear portion of the connection tube in the right angle direction, for externally discharging concentrated water.

According to another aspect of the present invention, a water purification filter easily replaced by a connector includes: a connector having an inflow hole through which external feed water flows in, a check valve body for housing a check valve elastically installed to open/close a feed water flowing path for guiding feed water from the inflow hole to a filter side, and an outflow hole for externally discharging purified water; a filter housing for housing one of the water purification filters such as a sediment filter, an activated charcoal filter and a hollow fiber filter, and opening the feed water flowing path by opening the check valve in connection with the connector; and a locking means installed in the connector, for detachably fixing the filter housing to the connector; and a passage switching guide being installed at the upper portion of the filter housing, and having a first path for supplying feed water to the water purification filter from the feed water flowing path opened when the filter housing is connected to the connector, and a second path for supplying water purified by the water purification filter to the outflow hole.

According to still another aspect of the present invention, a water purification system using a water purification filter easily replaced by a connector includes: a first connector having an inflow hole through which external feed water flows in, a check valve body for housing a check valve elastically installed to open/close a feed water flowing path for guiding feed water from the inflow hole to a filter side, and an outflow hole for externally discharging purified water; a first filter housing for housing a sediment filter, and opening the feed water flowing path by opening the check valve in detachable connection with the first connector; a second connector having its inflow hole connected in series to the outflow hole of the first connector, and including a check valve body for housing a check valve elastically installed to open/close a feed water flowing path for guiding feed water to a filter side, and an outflow hole for externally discharging purified water; a second filter housing for housing a precarbon filter, and opening the feed water flowing path by opening the check valve in detachable connection with the second connector; a third connector having its inflow hole connected in series to the outflow hole of the second connector, and including a check valve body in which a check valve elastically installed to open/close a feed water flowing path for guiding feed water to a filter side and a concentrated water discharge path for externally discharging concentrated water are formed, and an outflow hole for externally discharging purified water; a third filter housing for housing a reverse osmosis membrane filter, and opening the feed water flowing path by opening the check valve in detachable connection with the third connector; a fourth connector having its inflow hole connected in series to the outflow hole of the third connector, and including a check valve body for housing a check valve elastically installed to open/close a feed water flowing path for guiding feed water to a filter side, and an outflow hole for externally discharging purified water; and a fourth filter housing for housing a post-carbon filter, and opening the feed water flowing path by opening the check valve in detachable connection with the fourth connector.

Preferably, the locking means includes: a lower cover being mounted on the bottom surface of the connector, and having a through hole at its center and positioning grooves; filter support members being rotatably hinge-fixed on the positioning grooves, and having coupling grooves in an arc shape; and a lever having coupling protrusions movably coupled to the coupling grooves, and detachably locking the filter housing to the connector by rotating the filter support members by rotation by the user.

In addition, the locking means includes: a lower cover being mounted on the bottom surface of the connector, and having a through hole at its center and positioning grooves; filter support members being rotatably hinge-fixed on the positioning grooves, and having coupling grooves in an arc shape; a lever coupled between the lower cover and the connector to be swung, having coupling protrusions movably coupled to the coupling grooves, and detachably locking the filter housing to the connector by rotating the filter support members by rotation by the user; a stopper fixed on the bottom surface of the connector; a locking groove formed on the top surface of the lever to face the stopper; and an unlocking hole for unlocking the lever from the connector by separating the stopper from the locking groove when inserted into the through hole formed on the lever in the radial direction to be linked to the locking groove.

The water purification filter further includes stoppers formed on the positioning grooves of the lower cover contacting the through hole, for preventing excessive rotation of the filter support members by rotation of the lever.

At least two filter support members are rotatably mounted on the positioning grooves.

The water purification filter further includes an end processing member for sealing an extended strip end extended from the passage switching guide and coupled to the outer portion of the reverse osmosis membrane filter in order to prevent mixing of feed water flowing in through the path between the reverse osmosis membrane filter and the filter housing and concentrated water passing through the reverse osmosis membrane filter.

The filter support members are formed in a cam shape, and the shape of the positioning grooves on which the filter support members are mounted corresponds to the shape of the filter support members.

The concentrated water control hole includes:a body having a through hole at its lower portion in the radial direction to be linked to the concentrated water discharge path, and having a groove on its inner circumference in the length direction; a rotary strip rotatably coupled to the body, a slit having its opening degree variably controlled by rotation being formed on the strip; and a cap detachably coupled to the body, for preventing the rotary strip from being separated from the body and rotated by water pressure.

The concentrated water control hole is mounted on the upper or side portion of the connector.

The width of the slit formed on the rotary strip is formed in a conical shape so that the opening degree linked to the groove can be variably controlled by rotation of the rotary strip.

The filter housing is detachably screw-coupled to the cap or inseparably incorporated with the cap.

The water purification filter further includes locking means installed in the first to fourth connectors, for detachably fixing the first to fourth filter housings to the first to fourth connectors, respectively.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a cross-sectional diagram illustrating a water purification filter easily replaced by a connector in accordance with the preferred embodiment of the present invention;

DETAILED DESCRIPTION OF THE PREFERRED EMBODIMENT

A water purification filter easily replaced by a connector, and a water purification system using the same in accordance with the preferred embodiments of the present invention will now be described in detail with reference to the accompanying drawings, so that the ordinary people skilled in the art to which the present invention pertains can easily embody the present invention. However, it must be recognized that the following descriptions do not restrict the technical ideas and scope of the present invention.

Figure 11:
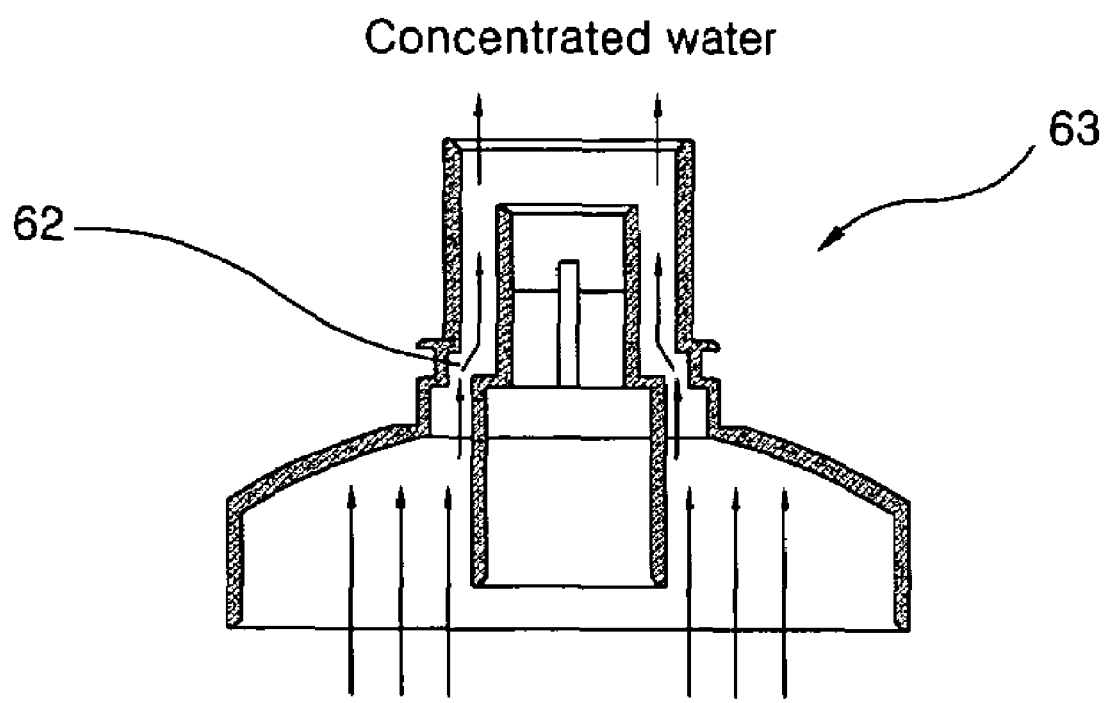
FIG. 11 is a cross-sectional diagram taken along line C-C of FIG. 8(a)
Figure 13:
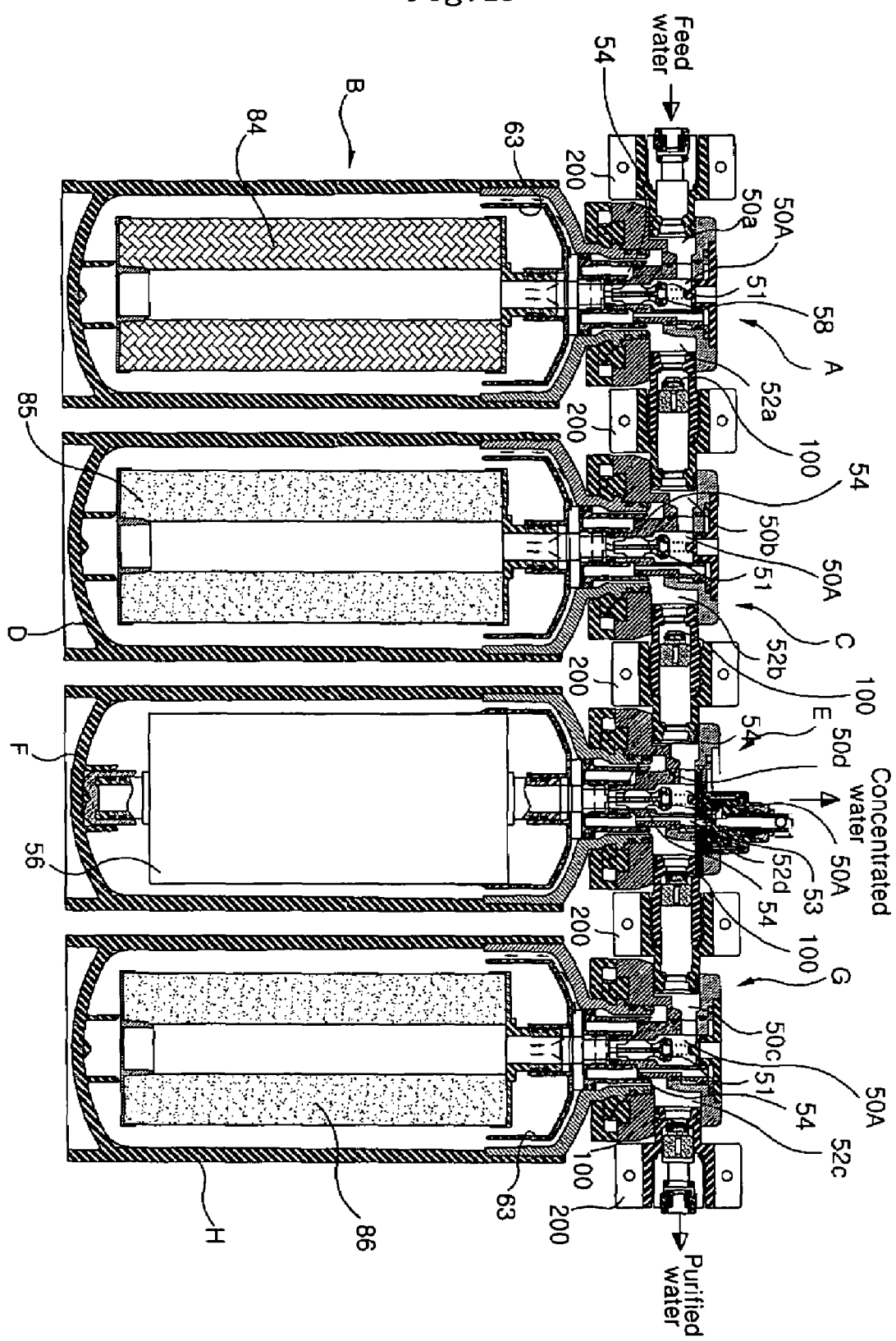
FIG. 13 is a structure diagram illustrating a water purification system in accordance with the preferred embodiment of the present invention.

As illustrated in FIGS. 3, 11 and 13, a reverse osmosis membrane filter easily replaced by a connector is comprised of a connector 55 having an inflow hole 50 through which external feed water (underground water) flows in, a check valve body 54 having, at its center, a feed water flowing path 50A for guiding feed water from the inflow hole 50 to a filter side and housing a check valve 51 elastically installed by an elastic member 58 to open/close the feed water flowing path 50A, and also having a concentrated water discharge path 53 for guiding concentrated water from the reverse osmosis membrane filter 56 to a concentrated water control hole 76 of the connector 55, a center through hole 50B for housing the check valve body 54, an outflow hole 52 for externally discharging purified water, and the concentrated water control hole 76 for externally discharging concentrated water from the concentrated water discharge path 53, and controlling a discharge amount thereof.

In addition, the filter includes a filter housing 57 for housing the reverse osmosis membrane filter 56 having a core type tube 59, and opening the feed water flowing path 50A by opening the check valve 51 in connection with the connector 55, and a locking means installed at the lower portion of the connector 55, for detachably fixing the filter housing 57 to the connector 55.

As shown in FIGS. 3 and 8 to 11, the filter includes a passage switching guide 63 being installed at the upper portion of the filter housing 57, and having a first path 60 for supplying feed water to the reverse osmosis membrane filter 56 from the feed water flowing path 50A opened when the filter housing 57 is connected to the connector 55, a second path 61 for supplying water purified and collected by the reverse osmosis membrane filter 56 from the tube 59 to the outflow hole 52, and a third path 62 for supplying concentrated water from the reverse osmosis membrane filter 56 to the concentrated water discharge path 53.

As depicted in FIGS. 4(a) to 7, the locking means includes a lower cover 66 being mounted on the bottom surface of the connector 55, and having a through hole 64 at its center and a plurality of positioning grooves 65 in the circumferential direction, at least two (four in the drawings) cam-shaped filter support members 69 being rotatably hinge-fixed on the positioning grooves 65 by fixing pins 67, and having coupling grooves 68 in an arc shape, and a lever 71 having coupling protrusions 70 slidably coupled to the coupling grooves 68, and detachably locking the filter housing 57 to the connector 55 by rotating the filter support members 69 on the central axes of the fixing pins 67 by rotation by the user (switched into the locking or unlock state).

The filter includes stoppers 72 protruded from the positioning grooves 65 of the lower cover 66 contacting the through hole 64, for preventing excessive rotation of the filter support members 69 by rotation of the lever 71.

Referring to FIG. 3, the filter includes an end processing member 75 (for example, a tape) for sealing an extended strip end 73 extended from the passage switching guide 63 and coupled to the outer portion of the reverse osmosis membrane filter 56 in order to prevent mixing of feed water flowing in through the path 74 between the reverse osmosis membrane filter 56 and the filter housing 57 and concentrated water discharged from the reverse osmosis membrane filter 56 to the discharge path 53.

As illustrated in FIGS. 3 and 13 to 15, the concentrated water control hole 76 includes a body 78 having a through hole 77 at its lower portion in the radial direction to be linked to the concentrated water discharge path 53, and having a groove 78a on its inner circumference in the length direction, a rotary strip 79 rotatably coupled to the body 78, a conical slit 79a having its opening degree linked to the groove 78a variably controlled by rotation being formed on the strip 79 in the radial direction for controlling a discharge amount of concentrated water, and a cap 80 detachably coupled to the body 78, for preventing the rotary strip 79 from being separated from the body 78 and rotated by water pressure.

Still referring to FIG. 3, the cap 82 is detachably screw-coupled to the upper end of the filter housing 57, or inseparably incorporated with the filter housing 57 by adhesion or welding. A collar 82 is formed at the neck unit of the cap 82 in the circumferential direction so that the cap 82 can be fixedly supported on the filter support members 69 by the locking means of the connector 55.

Reference numeral 83 denotes a concentrated water discharge tube hollowed to be linked to the through hole 77, for discharging concentrated water to an external designated space.

The using examples of the water purification filter easily replaced by the connector and the water purification system using the same in accordance with the present invention will now be described in detail with reference to the accompanying drawings.

As shown in FIG. 3, when the filter housing 57 having the reverse osmosis membrane filter 56 is inserted and connected to the connector 55 in the up direction (seen from the drawing), the feed water flowing path 50A is opened by upwardly pressurizing the check valve 51 by the passage switching guide 63 (here, the elastic member 58 is compressed).

Figure 1:
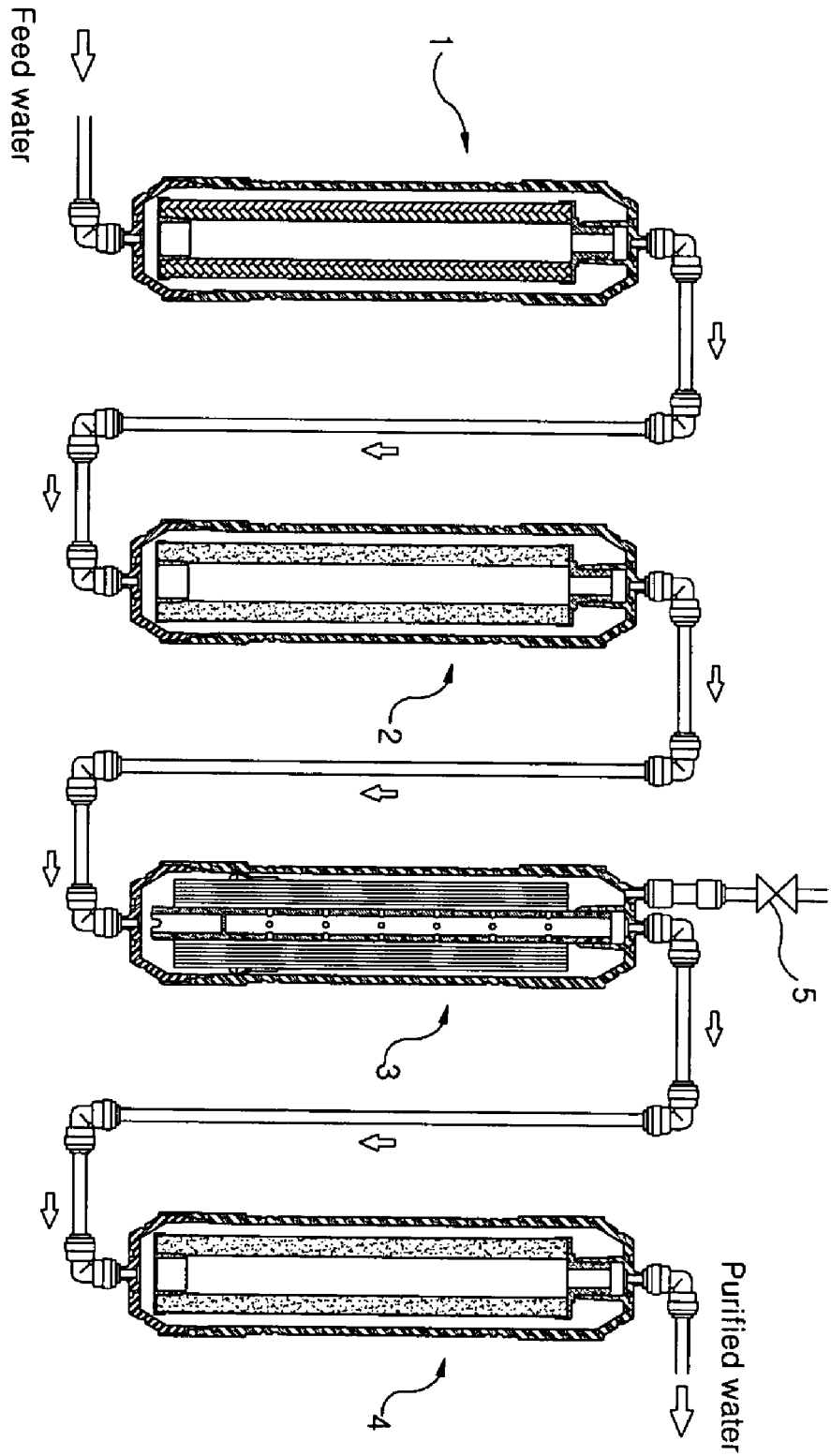
FIG. 1 is a schematic structure diagram illustrating a conventional water purification system using a reverse osmosis membrane filter.
Figure 2:
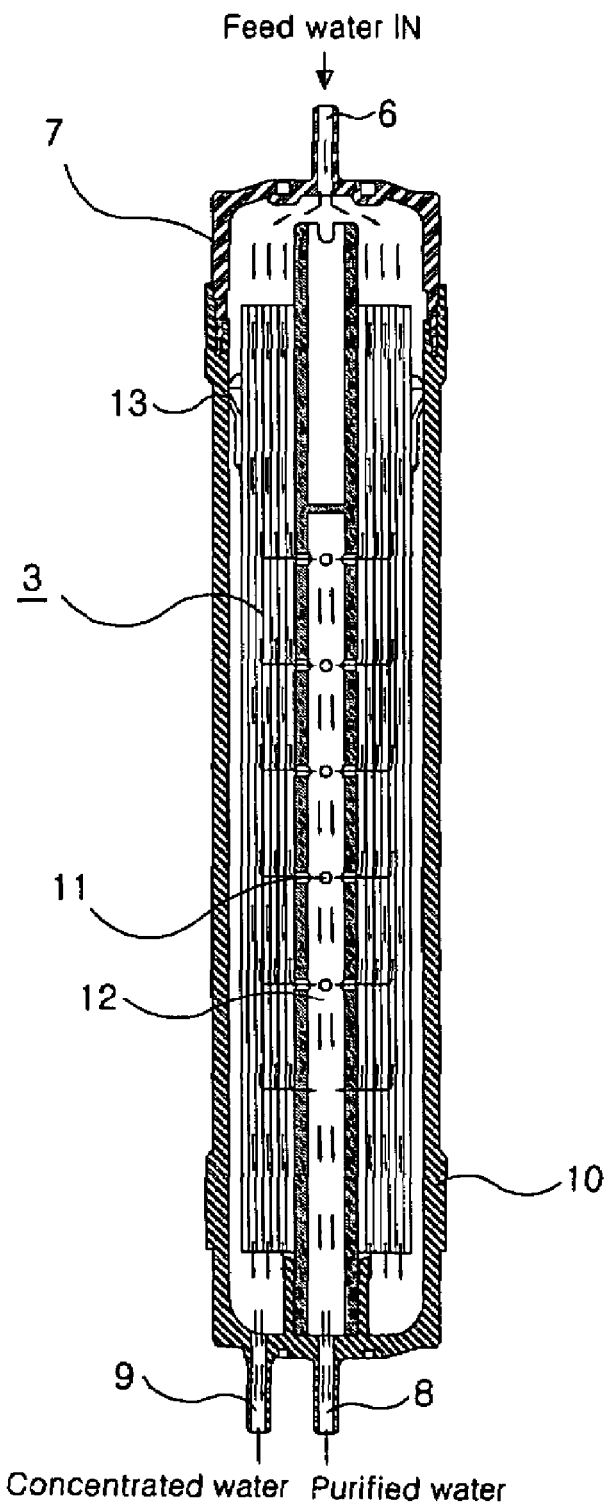
FIG. 2 is a schematic diagram illustrating the conventional reverse osmosis membrane filter.
Figure 4A:
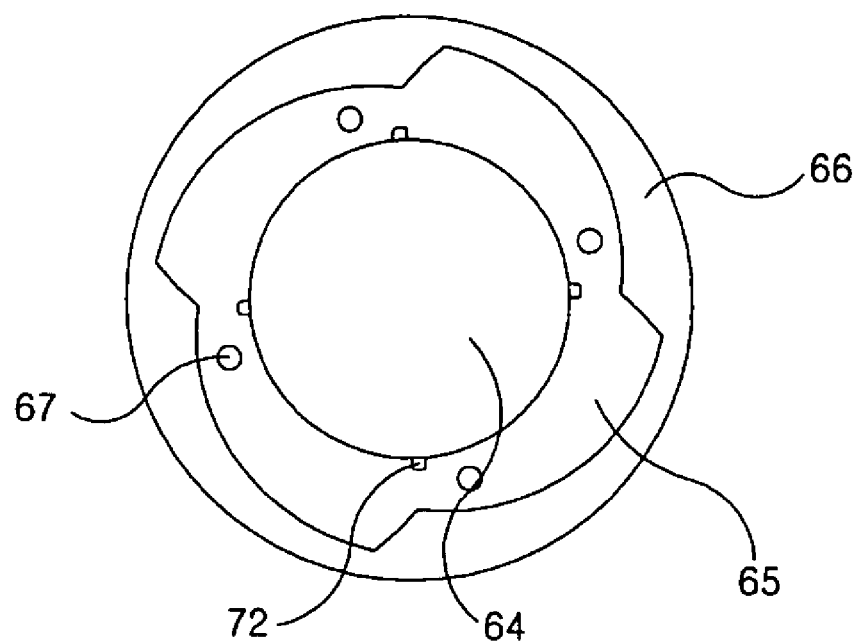
FIGS. 4(a) and 4(b) are a plane diagram and a sectional diagram illustrating a lower cover in accordance with the preferred embodiment of the present invention.
Figure 4B:
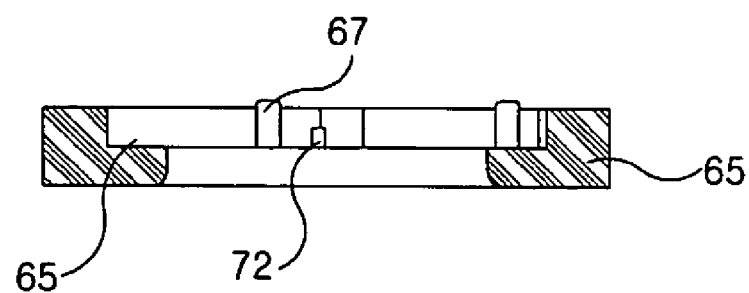
Figure 5A:
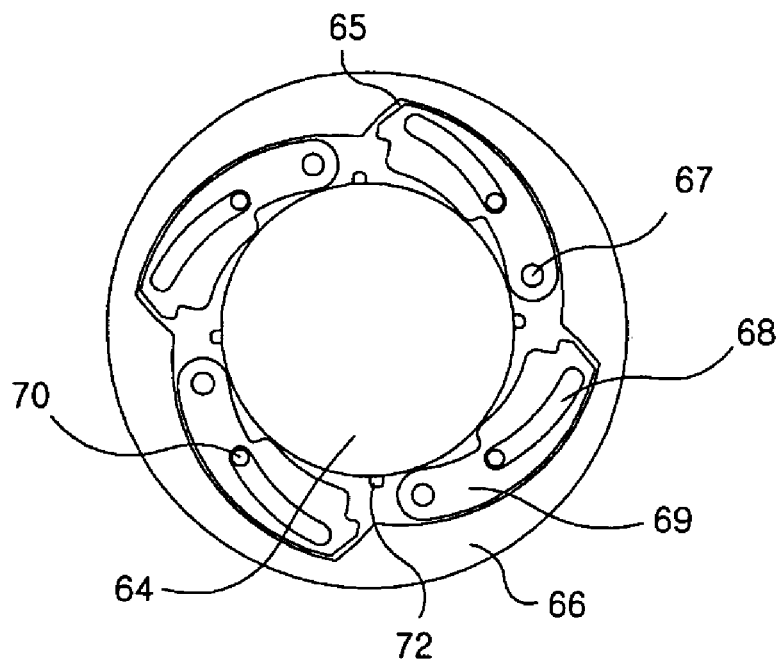
FIGS. 5(a) and 5(b) are plane diagrams illustrating an unlock state and a lock state of a locking means for detachably fixing a filter housing to a connector in accordance with the preferred embodiment of the present invention.
Figure 7:
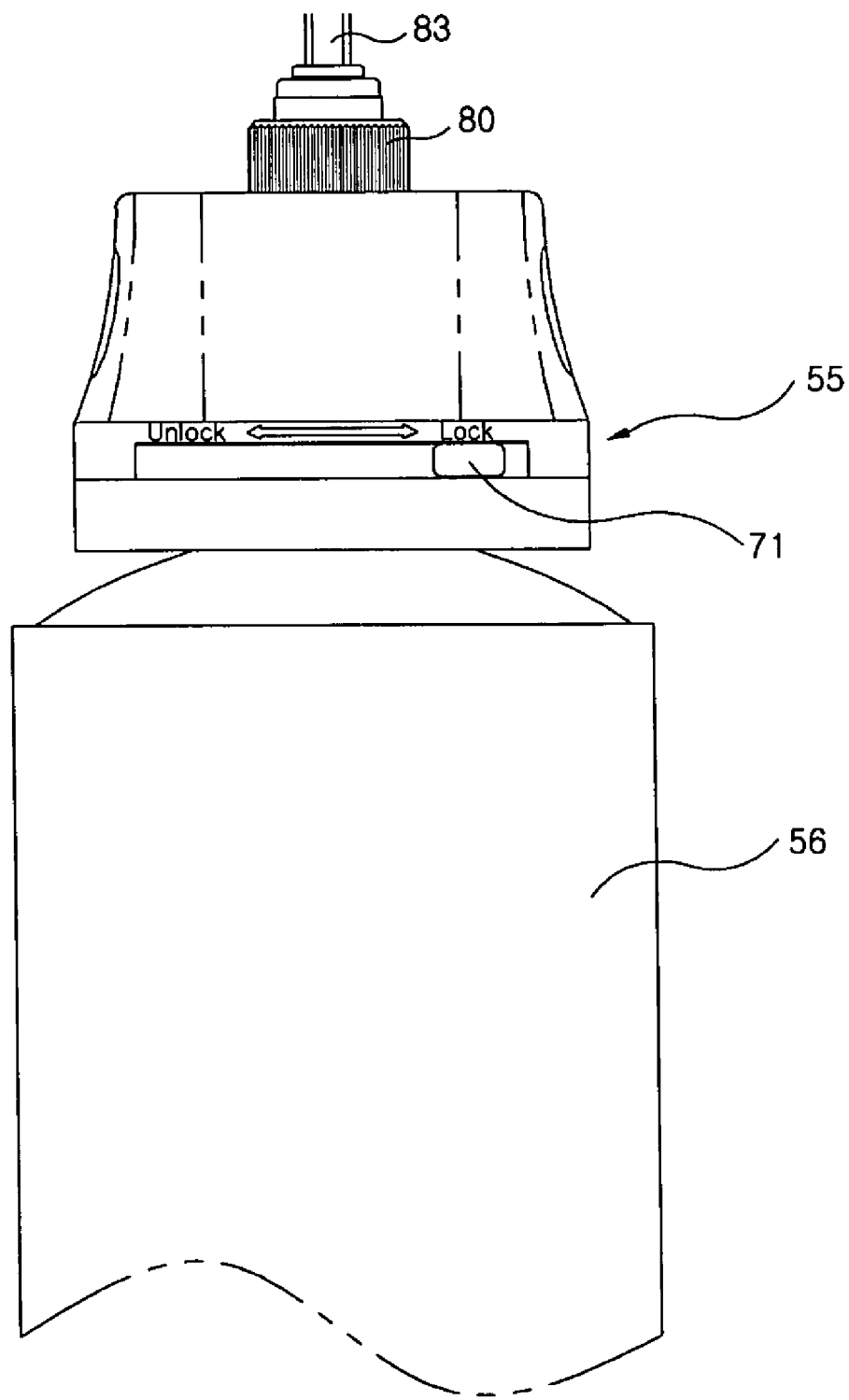
FIG. 7 is a using state diagram illustrating the lever of FIG. 6.

As illustrated in FIG. 7, when the filter housing 57 is inserted into the connector 55 in the unlock position (left direction in the drawing) by moving the lever 71 coupled to the lower cover 66, the cam-shaped filter support members 69 are rotated on the central axes of the fixing pins 67 mounted on the positioning grooves 65 of the lower cover 66 and transferred into the positioning grooves 65 (refer to FIG. 5(a)). Therefore, the filter housing 57 can be inserted and connected to the connector 55.

Here, the check valve 51 is upwardly lifted by the passage switching guide 63 coupled to the cap 82 of the filter housing 57, thereby opening the feed water flowing path 50A. Accordingly, the feed water supplied from an external source flows in the feed water flowing path 50A through the inflow hole 50, passes through the passage switching guide 63, and flows in the filter housing 57 through the path 74 (as indicated by the arrow directions of FIG. 3).

Figure 5B:
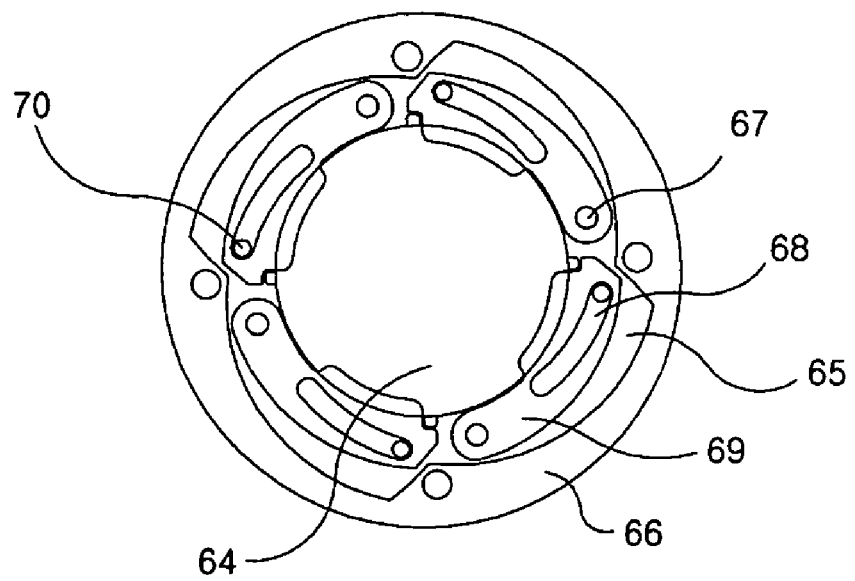
Figure 6A:
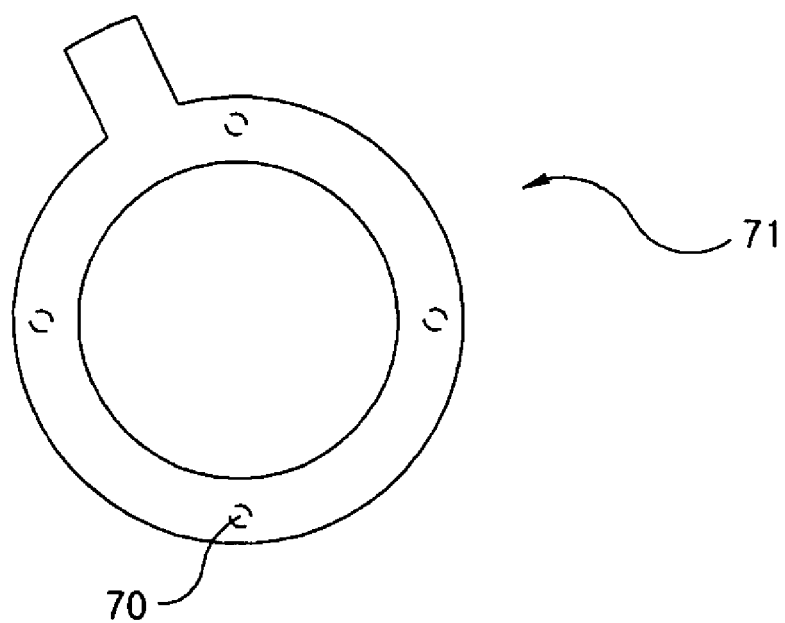
FIGS. 6(a) and 6(b) are a plane diagram and a sectional diagram illustrating a lever coupled to filter support members positioned on the lower cover of FIG. 5.
Figure 6B:
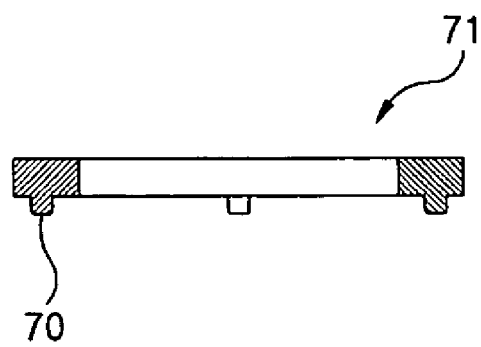

In the lock position by moving the lever 71, the coupling protrusions 70 of the lever 71 are slidably moved in the coupling grooves 68 of the filter support members 69 on the central axis of the through hole 64 of the lower cover 66, and thus the filter support members 69 are rotated on the central axes of the fixing pins 67 from the positioning grooves 65 of the lower cover 66 to the center through hole 64 (refer to FIG. 5(b)). The filter support members 69 are prevented from being excessively rotated by the stoppers 72 protruded from the positioning grooves 65.

Therefore, the collar 82a formed at the neck unit of the filter housing cap 82 is supported by the filter support members 69, thereby preventing the filter housing 57 from being disconnected from the connector 55.

Figure 8A:
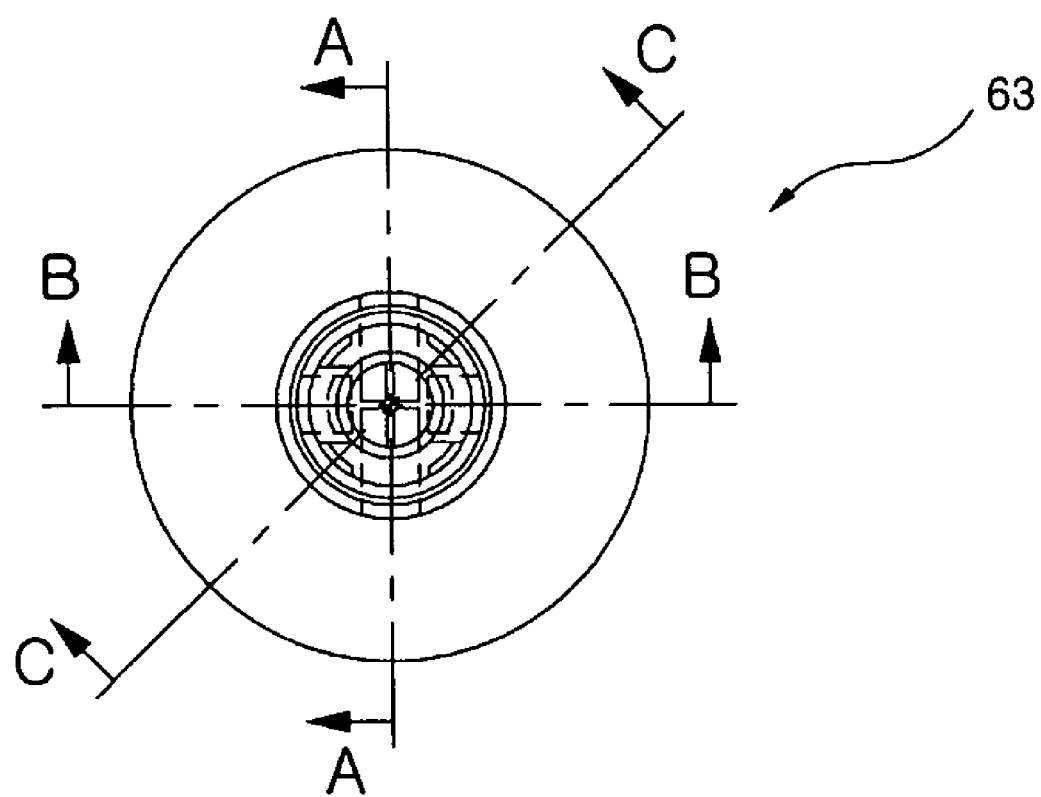
FIGS. 8(a) to 8(c) are a plane diagram, a front diagram and a bottom diagram illustrating a passage switching guide in accordance with the preferred embodiment of the present invention.
Figure 8B:
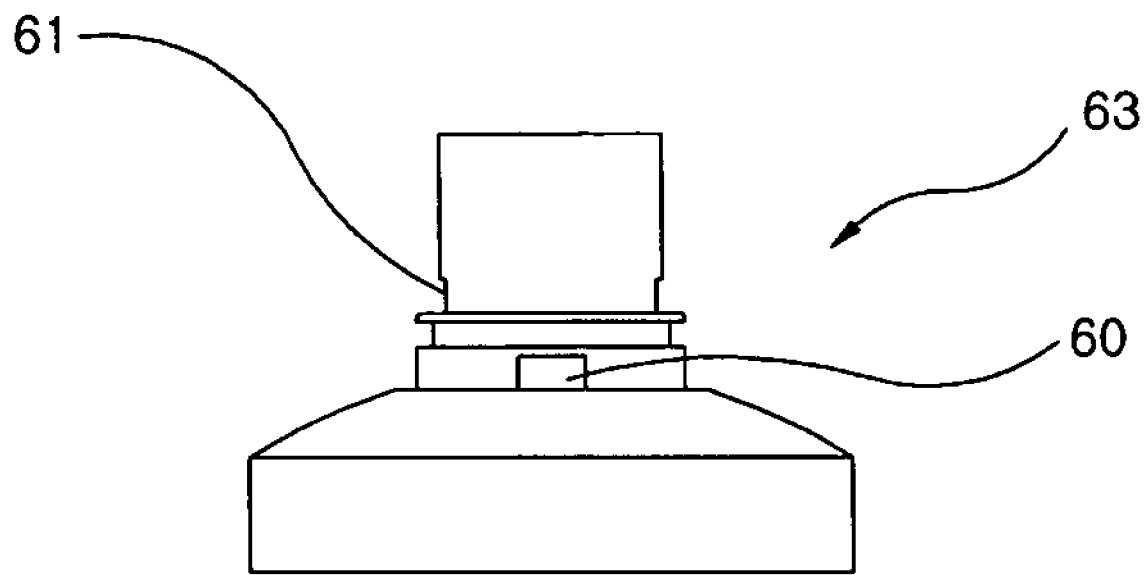
Figure 8C:
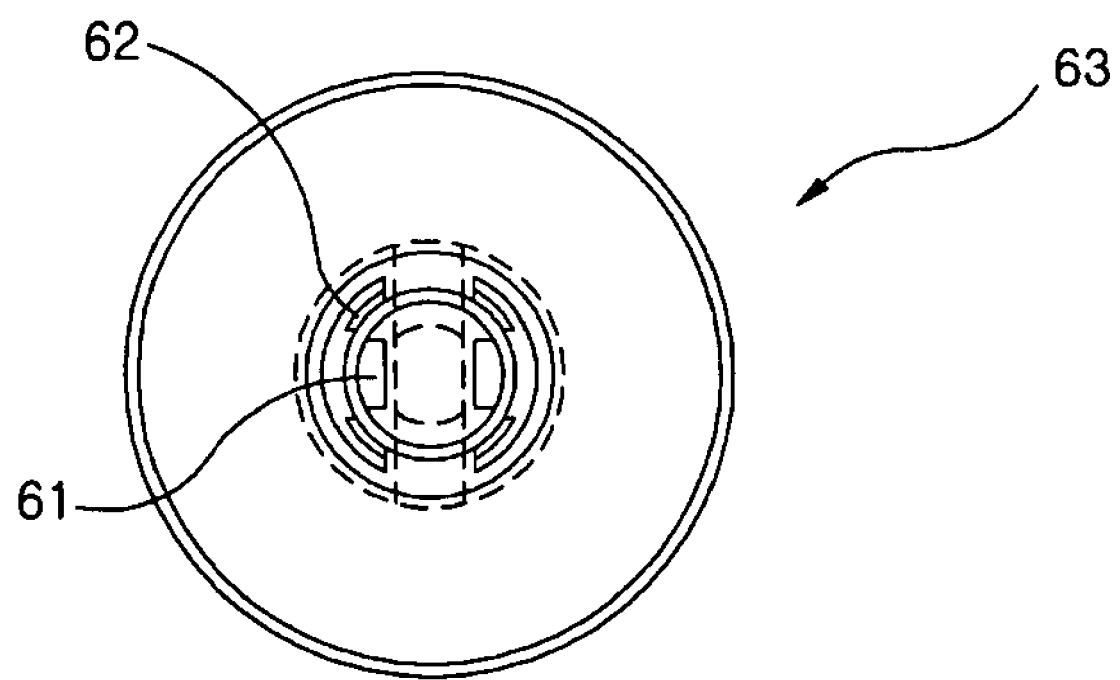
Figure 9:
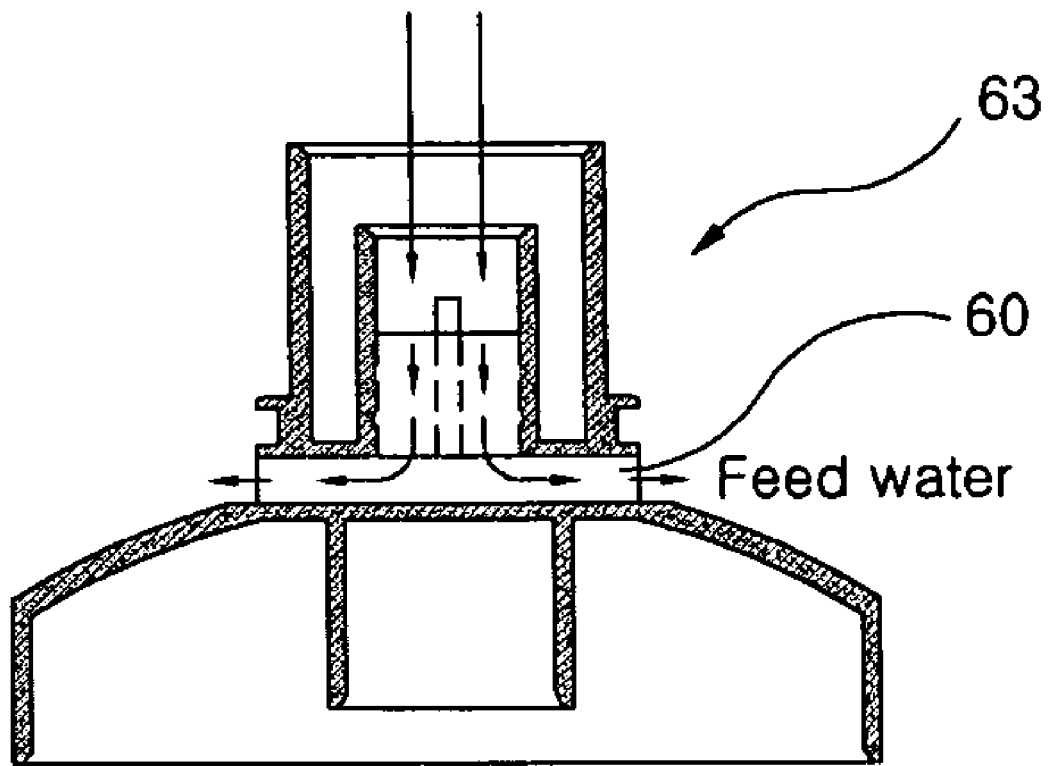
FIG. 9 is a cross-sectional diagram taken along line A-A of FIG. 8(a)

On the other hand, as shown in FIGS. 3, 8 and 9, the feed water passing through the inflow hole 50 of the connector 55 and the first path 60 of the passage switching guide 63 and flowing to the lower portion of the filter housing 57 along the path 74 is inwardly supplied through the bottom surface of the reverse osmosis membrane filter 56 installed in the filter housing 57. Here, the end processing member 75 for sealing the ring-shaped extended strip end 73 extended from the passage switching guide 63 prevents mixing of feed water flowing in the filter housing 57 and concentrated water discharged from the reverse osmosis membrane filter 56.

As a result, the reverse osmosis membrane filter 56 filters various impurities of feed water, and the purified water is collected in the core type tube 59 installed at the center of the reverse osmosis membrane filter 56, and transferred in the up direction (seen from the drawing).

The water purified by the reverse osmosis membrane filter 56 passes through the tube 59 and the second path 61 of the passage switching guide 63, and is externally discharged through the outflow hole 52 formed on the connector 55 (refer to FIGS. 3 and 8(b)). The concentrated water containing impurities filtered by the reverse osmosis membrane filter 56 sequentially passes through the third path 62 of the passage switching guide 63, the concentrated water discharge path 53 formed on the check valve body 54, and the concentrated water control hole 76 installed in the connector 55, and is discharged to the external designated space through the concentrated water discharge tube 83 (refer to FIGS. 3 and 11).

Figure 14:
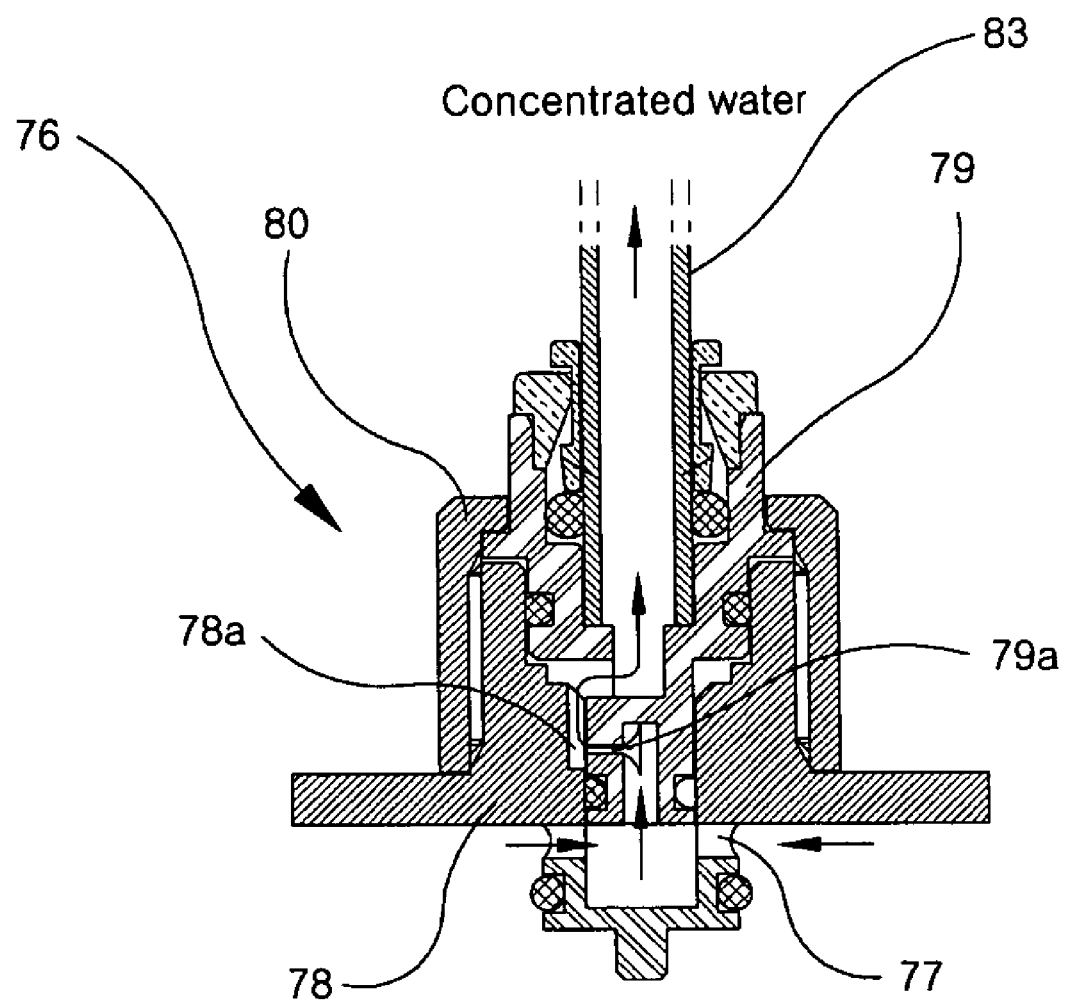
FIG. 14 is a cross-sectional diagram illustrating major parts of a concentrated water control hole mounted on the connector in accordance with the preferred embodiment of the present invention.

On the other hand, referring to FIGS. 3 and 14, the concentrated water discharged from the reverse osmosis membrane filter 56 passes through the third path 62 formed in the passage switching guide 63, the concentrated water discharge path 53 formed in the check valve body 54 installed in the connector 55 to be linked to the third path 62, the through hole 77 formed on the body 78 of the concentrated water control hole 76 to be linked to the concentrated water discharge path 53, the rotary strip 79 linked to the through hole 77, the variable width slit 79a formed on the cylindrical wall of the rotary strip 79, and the groove 78a formed on the inner circumference of the body 78 in the axial direction, and is externally discharged through the concentrated water discharge tube 83.

Controlled is the discharge amount of concentrated water passing through the through hole 77 formed on the body 78 in the radial direction and flowing in the body 78 and the rotary strip 79 rotatably coupled to the body 78. That is, the opening degree crossing the groove 78a formed on the inner circumference of the body 78 in the up/down direction is determined by rotating the rotary strip 79 having the variable width conical slit 79a on the body 78, thereby controlling the discharge amount of concentrated water.

Figure 10:
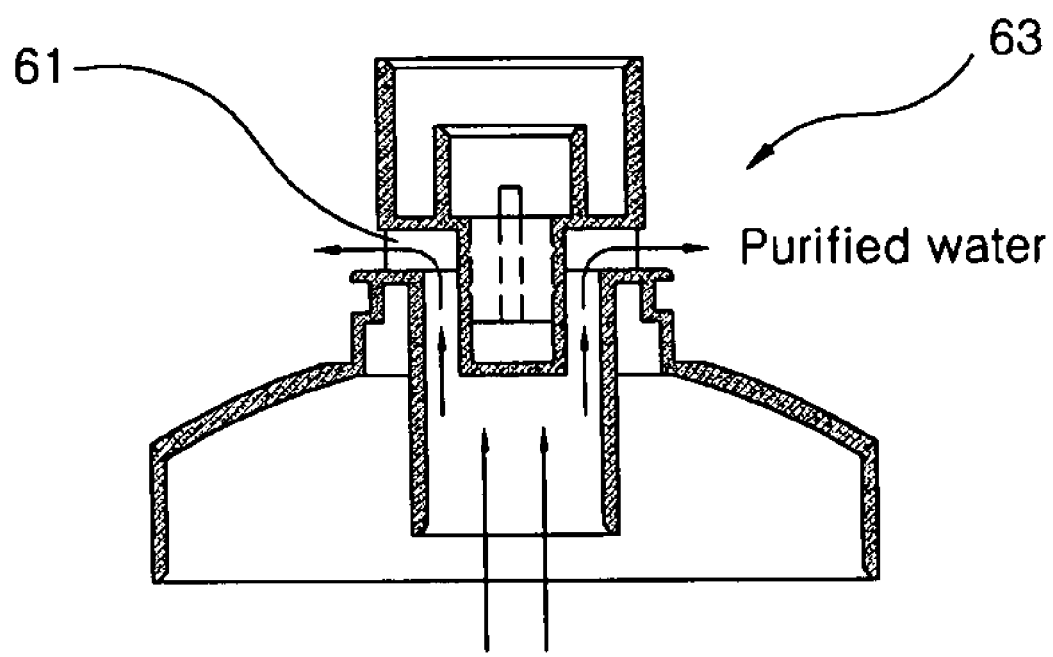
FIG. 10 is a cross-sectional diagram taken along line B-B of FIG. 8(a)

Referring to FIGS. 3, 8(c) and 10, the purified water discharged from the reverse osmosis membrane filter 56 is externally discharged through the tube 59, the second path 61 formed in the passage switching guide 63 to be linked to the tube 59, and the outflow hole 52 of the connector 55.

As illustrated in FIGS. 4(a) to 7, when the filter housing 57 needs to be disconnected from the connector 55 to replace the reverse osmosis membrane filter 56, the coupling protrusions 70 protruded from the lever 71 slidably move in the coupling grooves 68 of the filter support members 69 by switching the lever 71 into the unlock position. Therefore, the filter support members 69 are rotated on the central axes of the fixing pins 67, and transferred into the positioning grooves 65 of the lower cover 66 (refer to FIG. 5(a)).

Accordingly, the lock state of the filter support members 69 is released from the collar 82 of the filter housing cap 82, so that the filter housing 57 can be easily disconnected from the connector 55.

Figure 12:
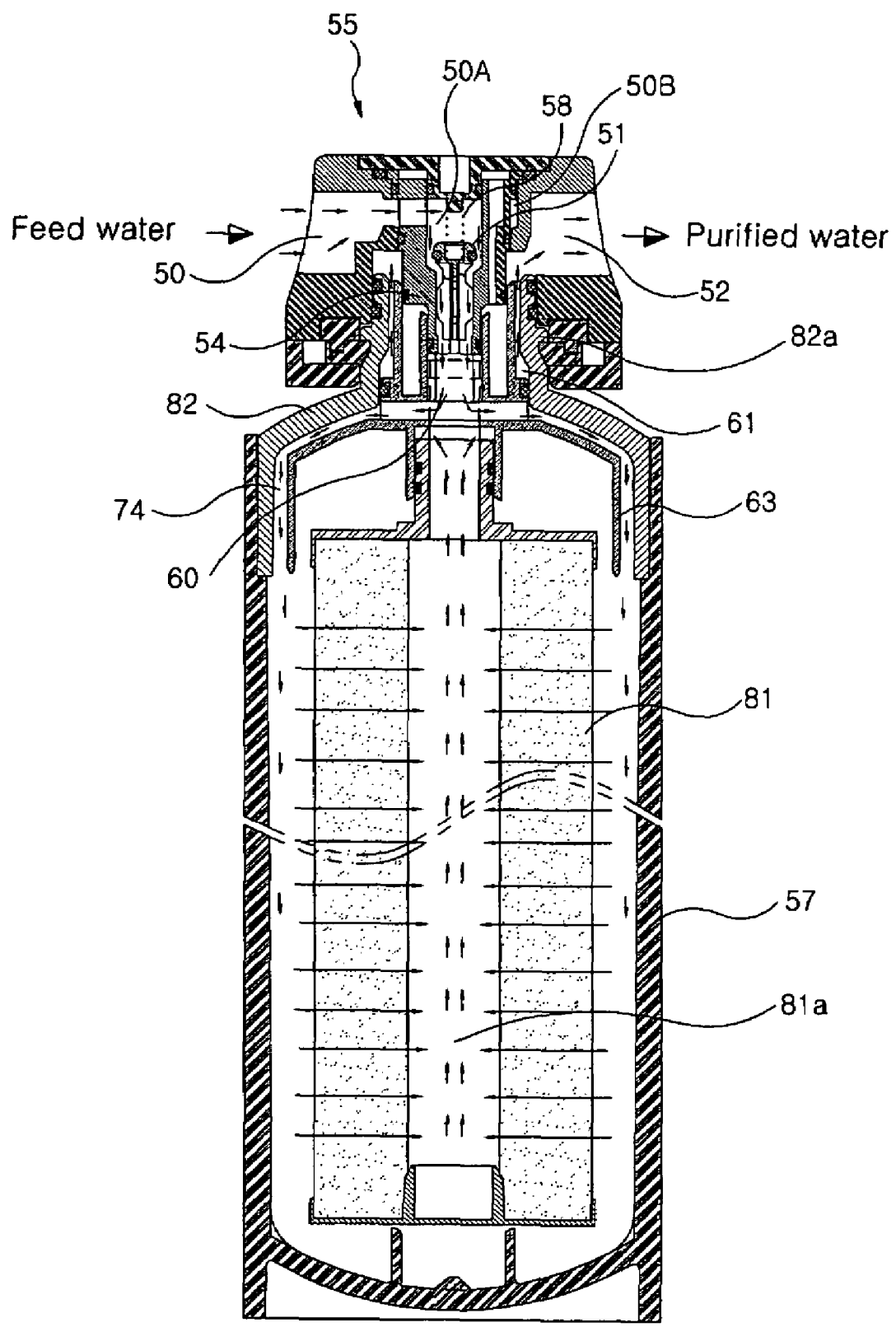
FIG. 12 is an exemplary diagram illustrating a modified example of the connector of the water purification filter easily replaced by the connector in accordance with the preferred embodiment of the present invention.

FIG. 12 is an exemplary diagram illustrating a modified example of the water purification filter easily replaced by the connector in accordance with the preferred embodiment of the present invention.

As depicted in FIG. 12, the water purification filter includes an inflow hole 50 through which external feed water flows in, a check valve body 54 having, at its center, a feed water flowing path 50A for guiding feed water from the inflow hole 50 to a filter side and housing a check valve 51 elastically installed by an elastic member 58 to open/close the feed water flowing path 50A, a filter housing 57 for housing one of water purification filters 81 such as a sediment filter, an activated charcoal filter and a hollow fiber filter, and opening the feed water flowing path 50A by opening the check valve 51 in connection with the connector 55, and a locking means installed in the connector 55, for detachably fixing the filter housing 57 to the connector 55.

In addition, the filter includes a passage switching guide 63 being installed at the upper portion of the filter housing 57, and having a first path 60 for supplying feed water to the water purification filter 81 from the inflow hole 50 and the feed water flowing path 50A opened when the filter housing 57 is connected to the connector 55, and a second path 61 for supplying purified water passing through a core-shaped through hole 81a of the water purification filter 81 to an outflow hole 52.

The structure of the modified filter is identical to that of the above-described filter except for the water purification filter 81 that is one of the sediment filter, the activated charcoal filter and the hollow fiber filter installed in the filter housing 57, and the connector 55 having the inflow hole 50 through which feed water flows in, the feed water flowing path 50A, and the outflow hole 52 for externally discharging purified water, and thus detailed explanations thereof are omitted. Same reference numerals are used for same elements in different drawings.

When the filter housing 57 is connected to the connector 55, the feed water flowing path 50A of the connector 55 is opened by upwardly lifting the check valve 51. The feed water supplied from an external source flows in the feed water flowing path 50A through the inflow hole 50, passes through the first path 60 formed in the passage switching guide 63 and the path 74, and flows in the filter housing 57.

The feed water flowing in the filter housing 57 flows in the water purification filter 81 that is one of the sediment filter, the activated charcoal filter and the hollow fiber filter installed in the filter housing 57 in the radial direction (as indicated by the arrow directions). The water purified by the water purification filter 81 is collected at the center of the water purification filter 81, upwardly transferred through the through hole 81a, and externally discharged through the second path 61 of the passage switching guide 62 and the outflow hole 52 of the connector 55 linked to the second path 61.

That is, the feed water flowing in the feed water flowing path 50A of the connector 55 through the inflow hole 50 flows in the filter housing 57 through the first path 60 of the passage switching guide 63, and is purified by the water purification filter 81. The purified water is discharged to the outflow hole 52 through the second path 61 of the passage switching guide 63.

Figure 15:
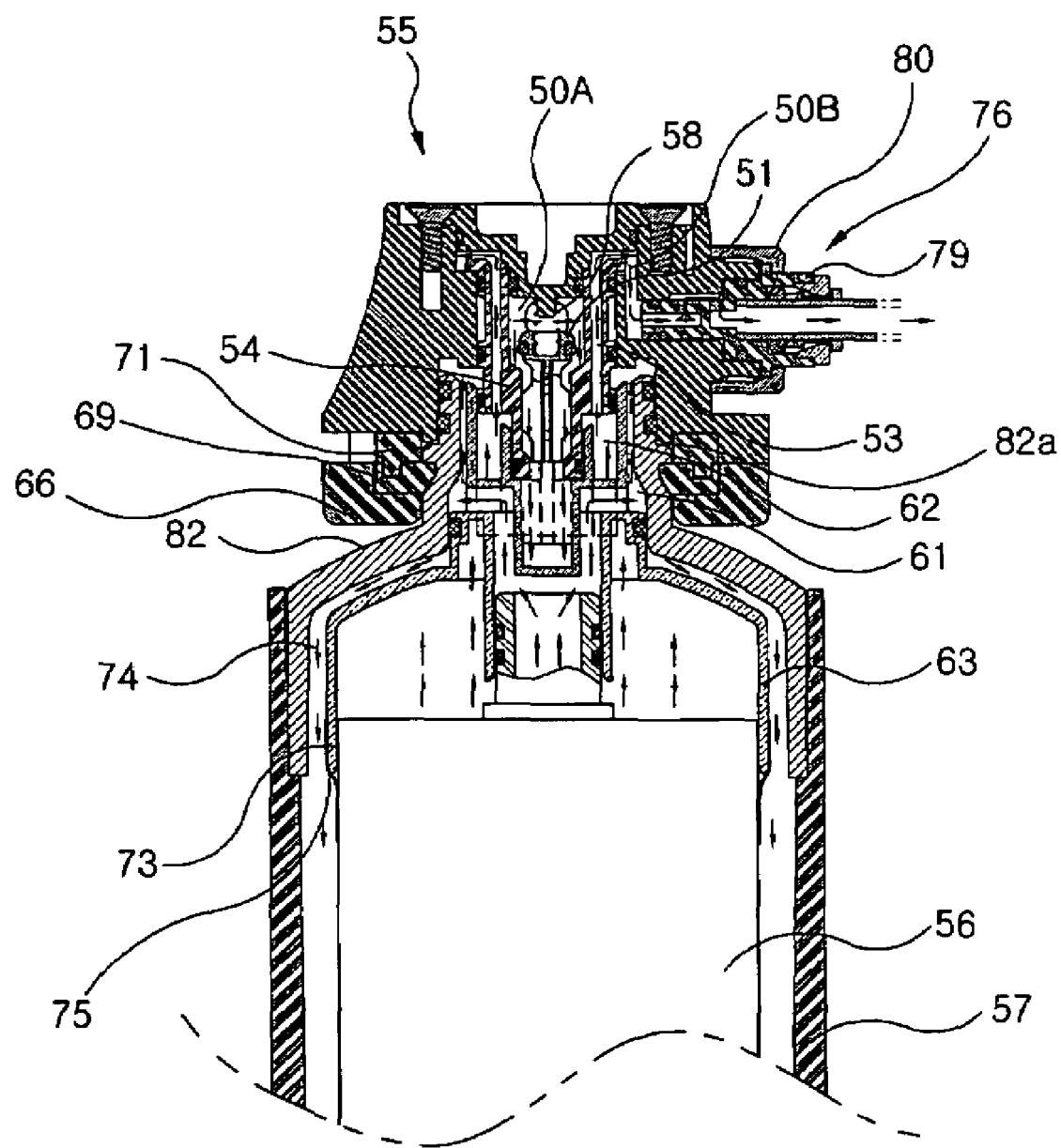
FIG. 15 is an exemplary diagram illustrating a modified example of the concentrated water control hole mounted on the connector in accordance with the preferred embodiment of the present invention.

As illustrated in FIG. 15, the concentrated water control hole 76 mounted on the connector 55 can be mounted on the side of the connector 55. Here, the structure of FIG. 15 is substantially identical to that of FIG. 3 except for the structure of discharging concentrated water in the side direction of the connector 55 through the discharge path 53 formed in the check valve body 54 installed in the connector 55, and thus detailed explanations thereof are omitted.

As shown in FIG. 13, the water purification system includes a first connector A having an inflow hole 50a through which external feed water flows in, a check valve body 54 for housing a check valve 52 elastically installed to open/close a feed water flowing path 50A for guiding feed water from the inflow hole 50a to a filter side, and an outflow hole 52a for externally discharging purified water, and a first filter housing B for housing a sediment filter 84 for removing various alien substances such as rust, soil and sand from feed water by a nonwoven fabric, and opening the feed water flowing path 50A by opening the check valve 51 in detachable connection with the first connector A.

In addition, the water purification system includes a second connector C having its inflow hole 50b connected in series to the outflow hole 52a of the first connector A, and including a check valve body 54 for housing a check valve 51 elastically installed to open/close a feed water flowing path 50A for guiding feed water from the inflow hole 50b to a filter side, and an outflow hole 52b for externally discharging purified water, and a second filter housing D for housing a precarbon filter 85 for removing organic chemical substances such as residual chloride by an activated charcoal, and opening the feed water flowing path 50A by opening the check valve 51 in detachable connection with the second connector C.

The water purification system also includes a third connector E having its inflow hole 50d connected in series to the outflow hole 52b of the second connector C, and including a check valve body 54 in which a check valve 51 elastically installed to open/close a feed water flowing path 50A for guiding feed water from the inflow hole 50d to a filter side and a concentrated water discharge path 53 for externally discharging concentrated water are formed, and a third filter housing F for housing a reverse osmosis membrane filter 56 for removing germs and mineral by minute pores, and opening the feed water flowing path 50A by opening the check valve 51 in detachable connection with the third connector E.

Furthermore, the water purification system includes a fourth connector G having its inflow hole 50c connected in series to the outflow hole 52d of the third connector E, and including a check valve body 54 for housing a check valve 51 elastically installed to open/close a feed water flowing path 50A, and an outflow hole 52c for externally discharging purified water, and a fourth filter housing H for housing a post-carbon filter 86 for improving water taste by removing smells by an activated charcoal, and opening the feed water flowing path 50A by opening the check valve 51 in detachable connection with the fourth connector G.

In addition, the water purification system includes locking means installed in the first to fourth connectors A, C, E and G, for detachably fixing the first to fourth filter housings B, D, F and H to the first to fourth connectors A, C, E and G, respectively.

A check valve 100 for preventing a counterflow is installed in a connection member 200 for connecting adjacent connectors in series to be linked to each other.

In the case that any one of the first to fourth filter housings B, D, F and H connected respectively to the first to fourth connectors A, C, E and G is disconnected from the corresponding connector, the corresponding inflow hole 50a, 50b, 50c or 50d is blocked by the returning operation of the check valves 51 coupled respectively to the first to fourth connectors A, C, E and G by the restoring force of the elastic member 58.

The check valve 100 for preventing the counterflow in the connection member 200 for connecting the adjacent connectors in series prevents a counterflow by a residual pressure of the lower connector or filter housing. Therefore, when any one of the first to fourth filter housings B, D, F and H is replaced, it is not necessary to switch the feed water locking valve into a lock state to prevent leakage of feed water.

Figure 16A:
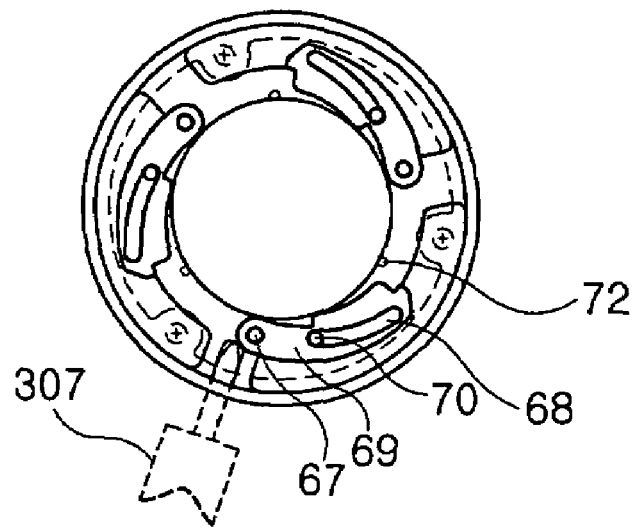
FIG. 16(a) is an exemplary diagram illustrating a modified example of the unlock state of the locking means for detachably fixing the filter housing to the connector in accordance with the preferred embodiment of the present invention.
Figure 16B:
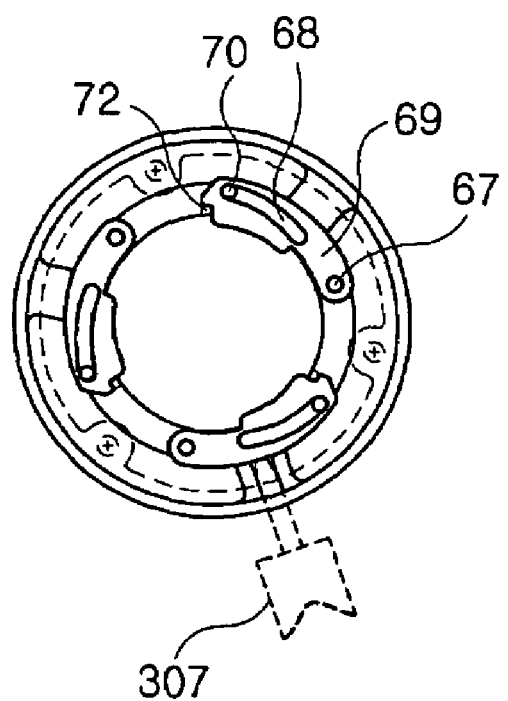
FIG. 16(b) is an exemplary diagram illustrating a modified example of the lock state of the locking means for detachably fixing the filter housing to the connector in accordance with the preferred embodiment of the present invention.
Figure 17:
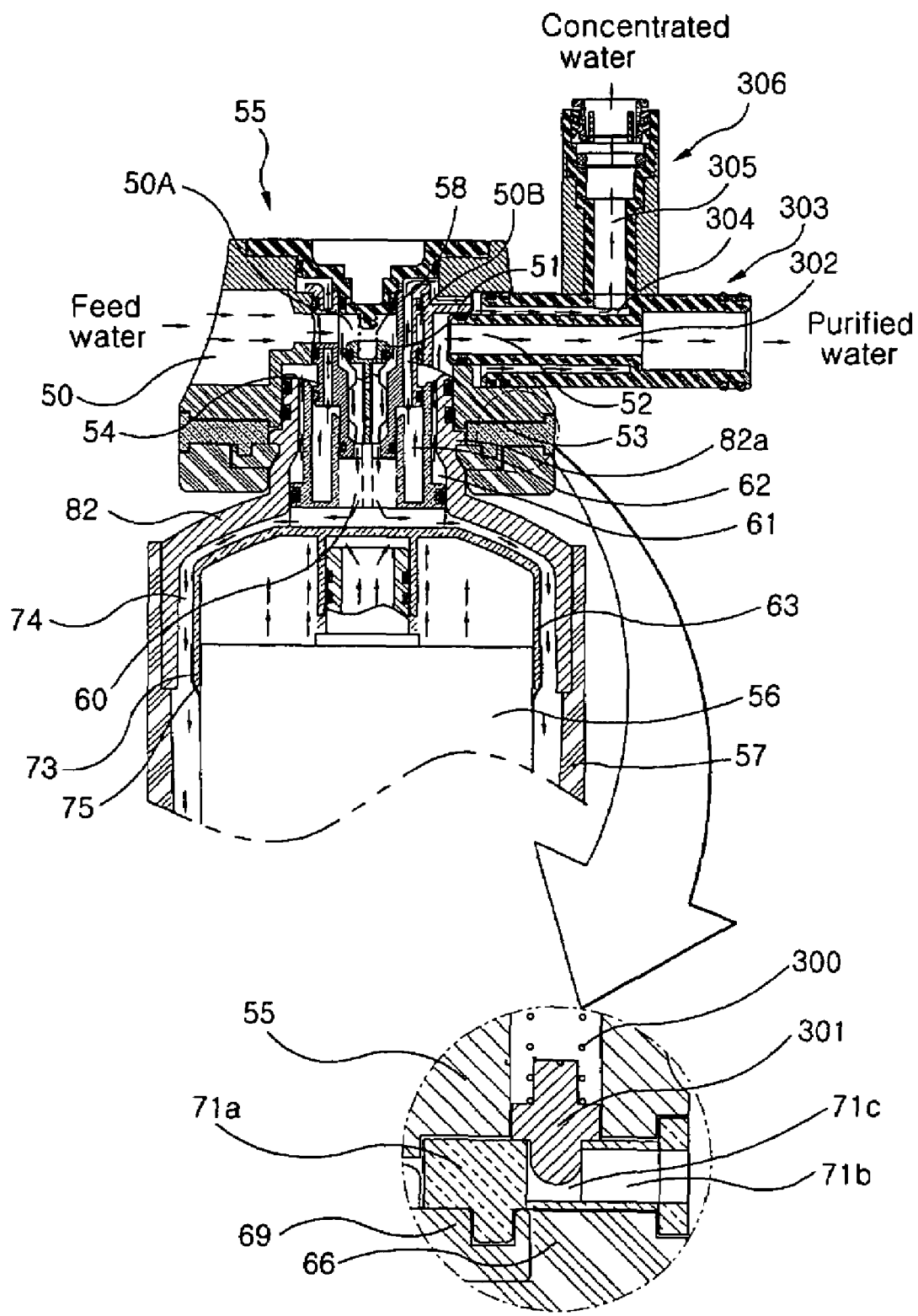
FIG. 17 is an exemplary diagram illustrating a modified example of the connector of the water purification filter easily replaced by the connector in accordance with the preferred embodiment of the present invention.

On the other hand, as illustrated in FIGS. 16 and 17, the locking means for detachably connecting the filter housing to the connector includes a lever 71a coupled between the lower cover 66 and the connector 55 to be swung, for detachably locking the filter housing 57 to the connector 55 by rotating the filter support members 69 by rotation by the user, a stopper 301 fixed on the bottom surface of the connector 55 by an elastic member 300, a locking groove 71c formed on the lever 71a in the up/down direction to face the stopper 301, a through hole 71b formed on the lever 71a in the radial direction to be linked to the locking groove 71c, and an unlocking hole 307 for unlocking the lever 71a from the connector 55 by separating the stopper 301 from the locking groove 71c when inserted into the through hole 71b.

The structure of FIGS. 16 and 17 is substantially identical to that of FIG. 3, except for the stopper 301 formed on the bottom surface of the connector 55, the locking groove 71c coupled to the stopper 301 for locking the lever 71a, and the unlocking hole 307 inserted into the locking groove 71c for unlocking the stopper 301, and thus detailed explanations thereof are omitted. Same reference numerals are used for same elements in different drawings.

As depicted in FIG. 17, the water purification filter easily replaced by the connector includes a double-tube type connection tube 303 installed on the outflow hole 52 of the connector 55, for externally discharging purified water passing through the second path 61 through a purified water path 302 formed at the center in the length direction to be linked to the second path 61, and externally discharging concentrated water passing through the third path 62 through a concentrated water path 304 formed outside the purified water path 302 to be linked to the third path 62, and a concentrated water discharge tube 306 linked to the concentrated water path 304 of the connection tube 303, and branch-connected to the rear portion of the connection tube 303 in the right angle direction, for externally discharging concentrated water.

Figure 18:
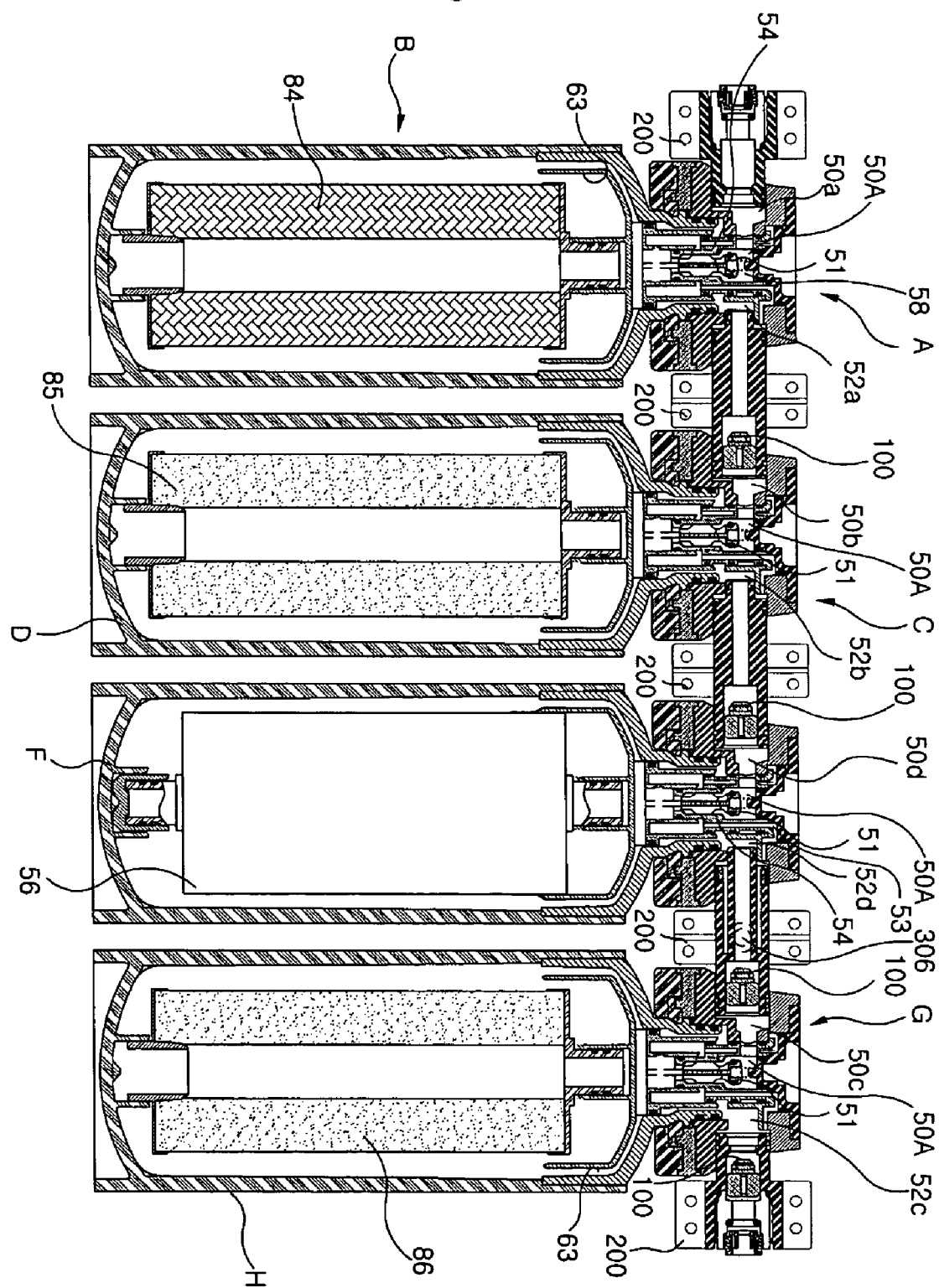
FIG. 18 is a structure diagram illustrating a water purification system in accordance with the preferred embodiment of the present invention.

Referring to FIGS. 17 and 18, when the third filter housing F composing the water purification system having the plurality of filter carriages is rotated on the third connector E for replacement, the concentrated water discharge tube 306 is disposed at the rear portion of the connection tube 303.

Accordingly, the third filter housing F can be easily replaced without interferences with the adjacent filter housing or hose (not shown).

As discussed earlier, in accordance with the present invention, the water purification filter easily replaced by the connector and the water purification system using the same have the following advantages.

When the filter cartridge of the water purification system is disconnected for replacement, it is not necessary to lock the feed water locking valve to prevent leakage of feed water. Therefore, operational efficiency is improved.

In addition, the connection structure of the water purification system is simplified by the structure of the reverse osmosis membrane filter having the paths of feed water, purified water and concentrated water as one port. As a result, the water purification system can be easily installed in a narrow space. The installation and assembly process of the filter cartridges can also be simplified to improve competitiveness.

Furthermore, the corresponding filter cartridge can be easily connected or disconnected to/from the water purification system, so that the general consumers can easily replace the filter.

What is claimed is:

1. A water purification filter easily replaced by a connector, comprising:
    a connector including an inflow hole through which external feed water flows in, a check valve body in which a check valve installed to open/close a feed water flowing path for guiding feed water from the inflow hole to a filter side is formed and a concentrated water discharge path is formed outside the check valve, an outflow hole for externally discharging water purified by a filter, and a concentrated water control hole for externally discharging concentrated water through a concentrated water discharge path, and controlling a discharge amount of concentrated water;
    a filter housing for housing a reverse osmosis membrane filter, and opening the feed water flowing path by opening the check valve in connection with the connector;
    a locking means installed in the connector, for detachably fixing the filter housing to the connector; and
    a passage switching guide being installed at the upper portion of the filter housing, and having a first path for supplying feed water to the reverse osmosis membrane filter from the feed water flowing path opened when the filter housing is connected to the connector, a second path for supplying water purified by the reverse osmosis membrane filter to the outflow hole, and a third path for supplying concentrated water from the reverse osmosis membrane filter to the concentrated water discharge path;
    wherein the locking means comprises:
    a lower cover being mounted on the bottom surface of the connector, and having a through hole at its center and positioning grooves;
    filter support members being rotatably hinge-fixed on the positioning grooves, and having coupling grooves in an arc shape; and
    a lever having coupling protrusions movably coupled to the coupling grooves, and detachably locking the filter housing to the connector by rotating the filter support members by rotation by the user.

2. The water purification filter according to claim 1, further comprising stoppers formed on the positioning grooves of the lower cover contacting the through hole, for preventing excessive rotation of the filter support members by rotation of the lever.

3. The water purification filter according to claim 1, wherein at least two filter support members are rotatably mounted on the positioning grooves.

4. The water purification filter according to claim 1, further comprising an end processing member for sealing an extended strip end extended from the passage switching guide and coupled to the outer portion of the reverse osmosis membrane filter in order to prevent mixing of feed water flowing in through the path between the reverse osmosis membrane filter and the filter housing and concentrated water passing through the reverse osmosis membrane filter.

5. The water purification filter according to claim 1, wherein the filter support members are formed in a cam shape, and the shape of the positioning grooves on which the filter support members are mounted corresponds to the shape of the filter support members.

6. The water purification filter according to claim 1, wherein the concentrated water control hole comprises:
   a body having a through hole at its lower portion in the radial direction to be linked to the concentrated water discharge path, and having a groove on its inner circumference in the length direction;
   a rotary strip rotatably coupled to the body, a slit having its opening degree variably controlled by rotation being formed on the strip; and
   a cap detachably coupled to the body, for preventing the rotary strip from being separated from the body and rotated by water pressure.

7. The water purification filter according to claim 6, wherein the width of the slit formed on the rotary strip is formed in a conical shape so that the opening degree linked to the groove can be variably controlled by rotation of the rotary strip.

8. The water purification filter according to claim 1, wherein the concentrated water control hole is mounted on the upper or side portion of the connector.

9. The water purification filter according to claim 1, wherein the filter housing is detachably screw-coupled to the cap or inseparably incorporated with the cap.

10. A water purification filter easily replaced by a connector, comprising:
    a connector including an inflow hole through which external feed water flows in, a check valve body in which a check valve installed to open/close a feed water flowing path for guiding feed water from the inflow hole to a filter side is formed and a concentrated water discharge path is formed outside the check valve, and an outflow hole for externally discharging water purified by a filter;
    a filter housing for housing a reverse osmosis membrane filter, and opening the feed water flowing path by opening the check valve in connection with the connector;
    a locking means installed in the connector, for detachably fixing the filter housing to the connector;
    a passage switching guide being installed at the upper portion of the filter housing, and having a first path for supplying feed water to the reverse osmosis membrane filter from the feed water flowing path opened when the filter housing is connected to the connector, a second path for supplying water purified by the reverse osmosis membrane filter to the outflow hole, and a third path for supplying concentrated water from the reverse osmosis membrane filter to a concentrated water discharge path;
    a double-tube type connection tube installed on the outflow hole, for externally discharging purified water passing through the second path through a purified water path formed at the center in the length direction, and externally discharging concentrated water passing through the third path and the concentrated water discharge path through a concentrated water path formed outside the purified water path; and
    a concentrated water discharge tube linked to the concentrated water path of the connection tube, and branch-connected to the rear portion of the connection tube in the right angle direction, for externally discharging concentrated water.

11. The water purification filter according to claim 10, wherein the locking means comprises:
    a lower cover being mounted on the bottom surface of the connector, and having a through hole at its center and positioning grooves;
    filter support members being rotatably hinge-fixed on the positioning grooves, and having coupling grooves in an arc shape;
    a lever coupled between the lower cover and the connector to be swung, having coupling protrusions movably coupled to the coupling grooves, and detachably locking the filter housing to the connector by rotating the filter support members by rotation by the user;
    a stopper fixed on the bottom surface of the connector;
    a locking groove formed on the top surface of the lever to face the stopper; and
    an unlocking hole for unlocking the lever from the connector by separating the stopper from the locking groove when inserted into the through hole formed on the lever in the radial direction to be linked to the locking groove.

12. The water purification filter according to claim 11, further comprising stoppers formed on the positioning grooves of the lower cover contacting the through hole, for preventing excessive rotation of the filter support members by rotation of the lever.

13. The water purification filter according to claim 11, wherein at least two filter support members are rotatably mounted on the positioning grooves.

14. The water purification filter according to claim 11, wherein the filter support members are formed in a cam shape, and the shape of the positioning grooves on which the filter support members are mounted corresponds to the shape of the filter support members.

15. The water purification filter according to claim 10, further comprising an end processing member for sealing an extended strip end extended from the passage switching guide and coupled to the outer portion of the reverse osmosis membrane filter in order to prevent mixing of feed water flowing in through the path between the reverse osmosis membrane filter and the filter housing and concentrated water passing through the reverse osmosis membrane filter.

* * * * *